United States Patent
Suzuki et al.

(10) Patent No.: US 7,269,409 B2
(45) Date of Patent: Sep. 11, 2007

(54) WIRELESS COMMUNICATION SYSTEM, TERMINAL, PROCESSING METHOD FOR USE IN THE TERMINAL, AND PROGRAM FOR ALLOWING THE TERMINAL TO EXECUTE THE METHOD

(75) Inventors: Hideyuki Suzuki, Tokyo (JP); Shin Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 10/784,271

(22) Filed: Feb. 24, 2004

(65) Prior Publication Data

US 2004/0253943 A1 Dec. 16, 2004

(30) Foreign Application Priority Data

Mar. 6, 2003 (JP) ............................. 2003-059359

(51) Int. Cl.
*H04M 1/66* (2006.01)
(52) U.S. Cl. ........................................ 455/411; 455/41
(58) Field of Classification Search ................ 455/411, 455/463, 41, 410; 713/156; 725/116; 726/8; 370/261
See application file for complete search history.

(56) References Cited

U.S. PATENT DOCUMENTS

| | | | | |
|---|---|---|---|---|
| 6,477,708 | B1 * | 11/2002 | Sawa ........................... | 725/116 |
| 6,640,108 | B2 * | 10/2003 | Lu et al. ...................... | 455/463 |
| 6,754,829 | B1 * | 6/2004 | Butt et al. ..................... | 726/8 |
| 2001/0022780 | A1 * | 9/2001 | Mizutani et al. ............. | 370/261 |
| 2002/0098830 | A1 * | 7/2002 | Lauper et al. ............... | 455/411 |
| 2004/0067750 | A1 * | 4/2004 | Engstrom et al. ........... | 455/411 |
| 2004/0152446 | A1 * | 8/2004 | Saunders et al. ............ | 455/411 |
| 2005/0149724 | A1 * | 7/2005 | Graff ........................... | 713/156 |
| 2005/0191990 | A1 * | 9/2005 | Willey et al. ................ | 455/411 |

FOREIGN PATENT DOCUMENTS

| | | |
|---|---|---|
| JP | 7-203540 | 8/1995 |
| JP | 2002-198971 | 7/2002 |
| JP | 2002-359623 | 12/2002 |
| JP | 2003-5641 | 1/2003 |
| JP | 2003-258790 | 9/2003 |
| JP | 2003-274454 | 9/2003 |
| JP | 2004-32664 | 1/2004 |
| JP | 2004-180010 | 6/2004 |

OTHER PUBLICATIONS

U.S. Appl. No. 10/784,271, filed Feb. 24, 2004, Suzuki et al.
U.S. Appl. No. 10/508,137, filed Sep. 17, 2004, Suzuki.
U.S. Appl. No. 10/509,872, filed Oct. 1, 2004, Suzuki.
U.S. Appl. No. 10/792,798, filed Mar. 5, 2004, Saito et al.
U.S. Appl. No. 10/784,271, filed Feb. 24, 2004, inventor Suzuki et al.
U.S. Appl. No. 11/567,067, filed Dec. 5, 2006, inventor Suzuki.

* cited by examiner

*Primary Examiner*—Joseph Feild
*Assistant Examiner*—Michael T. Vu
(74) *Attorney, Agent, or Firm*—Oblon, Spivak, McClelland, Maier & Neustadt, P.C.

(57) ABSTRACT

A terminal B, which is to enter a network, transmits a beacon including a network identifier and an operation mode of the terminal B. As the network identifier, the terminal identifier of a terminal that has issued an attribute certificate used for connecting the terminal B to the network can be used. Upon receiving the beacon, a terminal A checks whether the operation mode of the terminal A coincides with the operation mode contained in the beacon. The terminal A then sends an authentication request to the terminal B by providing an attribute certificate that matches the network identifier contained in the beacon.

5 Claims, 13 Drawing Sheets

FIG. 2

| TERMINAL IDENTIFIER #1 | PUBLIC KEY CERTIFICATE #1 | ATTRIBUTE CERTIFICATE INDEX #1 |
|---|---|---|
| TERMINAL IDENTIFIER #2 | PUBLIC KEY CERTIFICATE #2 | ATTRIBUTE CERTIFICATE INDEX #2 |
| ⋮ | ⋮ | ⋮ |

FIG. 4

| INDEX #1 | ATTRIBUTE CERTIFICATE #1 |
|---|---|
| INDEX #2 | ATTRIBUTE CERTIFICATE #2 |
| ⋮ | ⋮ |

FIG. 8

| TERMINAL IDENTIFIER #1 | MANAGEMENT POLICY #1 |
|---|---|
| TERMINAL IDENTIFIER #2 | MANAGEMENT POLICY #2 |
| ⋮ | ⋮ |

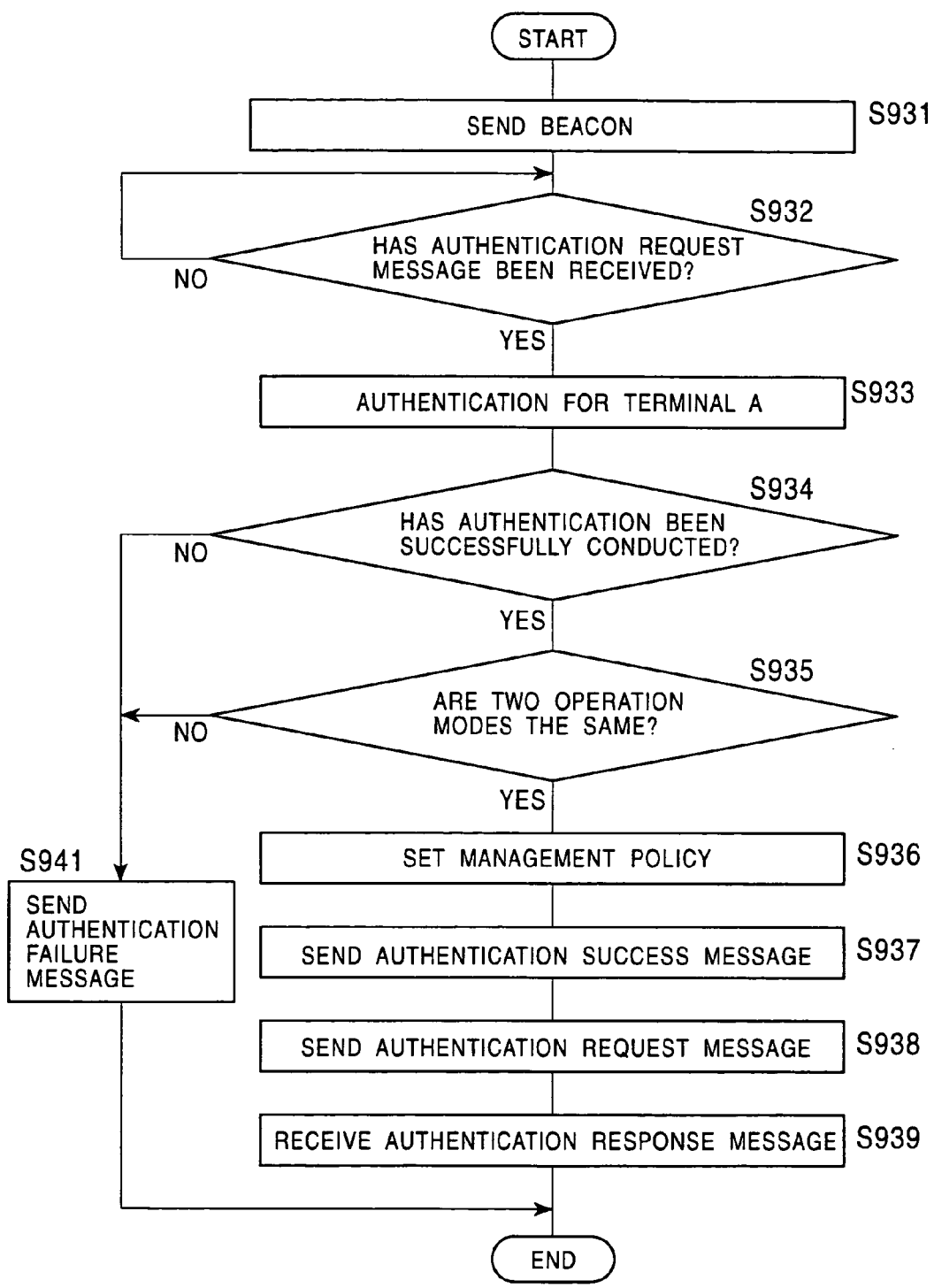

ND IRELESS COMMUNICATION SYSTEM, TERMINAL, PROCESSING METHOD FOR USE IN THE TERMINAL, AND PROGRAM FOR ALLOWING THE TERMINAL TO EXECUTE THE METHOD

BACKGROUND OF THE INVENTION

1. Field of the Invention

The present invention relates to wireless communication systems, and more particularly, to a wireless communication system for authenticating a right to access a network by using a certificate that serves to authorize a terminal to access a network (hereinafter simply referred to as a "certificate of privilege"). The invention also pertains to a terminal used in the above-described system, a processing method for use in the terminal, and a program for allowing a computer (terminal) to execute the processing method. Particularly, the present invention is effective in a wireless network in which all the wireless terminals forming the network send management information, for example, beacons.

2. Description of the Related Art

When connecting terminals to a network in a typical wireless communication system, a network administrator manually sets a unique identifier (for example, Extended Service Set IDentifier (ESS ID)) in an access point, and a user using the access point sets the identifier in a wireless terminal of the user. In this manner, the terminals forming a network can be associated with the network. Accordingly, even in an environment of an infrastructure mode in which a plurality of networks are present, a desired access point can be uniquely identified.

Even in an infrastructure mode without specific access points, a network administrator determines a unique identifier, and then, the network administrator or users manually set the identifier in the corresponding terminals. This enables each terminal to determine whether the other terminals belong to the same network.

Japanese Unexamined Patent Application Publication No. 2002-198971 (FIG. 4) discloses the following system using an identifier. In this system, an identifier different from an ESSID is defined and is set when terminals are shipped. Alternatively, such an identifier is set such that the user can rewrite the identifier. If the identifier sent together with a connection request from another terminal coincides with the identifier of the own terminal, such a terminal is allowed to connect to the network. If not, the connection request is rejected.

In the above-described system, the identifier determined for each network is manually set in each terminal, or the identifier is set when the terminals are shipped. It is troublesome, however, for the user to manually set the identifier, and the user may make an error when setting the identifier. Even if the identifier is set in advance, it may have to be changed due to a change in a network structure, thereby increasing a burden to the user.

Additionally, if all the terminals having the same identifier are allowed to access a network under the same condition, they can also access files which should not be unconditionally made open, thereby causing the security problems. Thus, the management of access rights must also be considered in terms of the security.

Access rights can be managed by using certificates of privilege, for example, attribute certificates. In this case, however, a verification process using a public key of a certificate issuer is required. Accordingly, it is not practical to exchange certificates of privilege through a routine operation by, for example, sending and receiving beacons.

SUMMARY OF THE INVENTION

Accordingly, it is an object of the present invention to allow terminals, when connecting to a network in a wireless communication system, to identify the network or to indicate an access right of the terminal in the network.

In order to achieve the above object, according to one aspect of the present invention, there is provided a wireless communication system including a plurality of terminals. The wireless communication system includes: a first terminal for sending a signal including beacon information having an identifier that identifies the type of certificate of privilege; and a second terminal for sending an authentication request to the first terminal in response to the signal sent from the first terminal by providing the type of certificate of privilege which matches the identifier. With this configuration, by being triggered by a signal including beacon information sent from the first terminal, an authentication request can be made by providing the type of certificate of privilege that matches the identifier contained in the signal.

According to another aspect of the present invention, there is provided a wireless communication system including a plurality of terminals. The wireless communication system includes: a first terminal for sending a signal including beacon information indicating an operation mode of the first terminal; and a second terminal for sending, when the operation mode of the first terminal coincides with an operation mode of the second terminal, an authentication request to the first terminal in response to the signal sent from the first terminal by providing a certificate of privilege indicating a right concerning the operation mode of the second terminal. With this configuration, the second terminal can check whether the operation mode of the second terminal coincides with that of the first terminal, and also, the operable mode of the second terminal can be checked in the first terminal.

According to still another aspect of the present invention, there is provided a terminal including: a certificate of privilege table for storing a certificate of privilege indicating an access right of the terminal; a receiver for receiving a signal including beacon information having an identifier that identifies the type of certificate of privilege from a first terminal; and an authentication request unit for sending an authentication request to the first terminal by providing the certificate of privilege stored in the certificate of privilege table that matches the identifier contained in the signal received by the receiver. With this configuration, by being triggered by a signal including beacon information sent from the first terminal, an authentication request can be made by providing the type of certificate of privilege that matches the identifier contained in the signal.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

The aforementioned terminal may further include: a certificate-of-privilege issuing terminal list table for storing a public key certificate of a terminal that has issued the certificate of privilege; an authentication-request receiver for receiving a second authentication request from the first terminal in response to the authentication request sent from the authentication request unit; and a verification unit for verifying a second certificate of privilege contained in the second authentication request received by the authentication-request receiver by using a public key contained in the public key certificate stored in the certificate-of-privilege issuing terminal list table. With this arrangement, the certificate of privilege indicating an access right of the beacon-signal transmission terminal is verified by the beacon-signal reception terminal.

In the aforementioned terminal, the identifier may be a terminal identifier of a terminal that has issued the certificate of privilege, and the certificate-of-privilege issuing terminal list table may store the terminal identifier of the terminal that has issued the certificate of privilege, the public key certificate of the terminal that has issued the certificate of privilege, and a storage location of the certificate of privilege in the certificate of privilege table in association with each other. With this arrangement, the identifier that identifies the type of certificate of privilege can be associated with the certificate of privilege.

According to a further aspect of the present invention, there is provided a terminal including: a certificate of privilege table for storing a certificate of privilege indicating an access right of the terminal; and a sender for sending a first terminal a signal including beacon information having an identifier that identifies the type of certificate of privilege stored in the certificate of privilege table. With this configuration, the type of certificate of privilege to be provided when sending an authentication request is known to a beacon-signal reception terminal.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

According to a yet further aspect of the present invention, there is provided a terminal including: a certificate of privilege table for storing a plurality of certificates of privilege indicating an access right of the terminal; a selector for providing an instruction to select one of the plurality of certificates of privilege stored in the certificate of privilege table; and a sender for sending a first terminal a signal including beacon information having an identifier that identifies the type of the certificate of privilege selected by the selector. With this configuration, a certificate of privilege is selected from a plurality of certificates of privilege and is reported as the type of certificate of privilege to be provided when sending an authentication request.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

According to a further aspect of the present invention, there is provided a terminal including: a certificate of privilege table for storing a certificate of privilege indicating an access right of the terminal; a status table for storing an operation mode of the terminal; a receiver for receiving a signal including beacon information having an operation mode of a first terminal from the first terminal; and an authentication request unit for sending, when the operation mode of the terminal and the operation mode of the first terminal coincides with each other, an authentication request to the first terminal by providing the certificate of privilege stored in the certificate of privilege table. With this configuration, the terminal can send an authentication request to a communicating terminal whose operation mode coincides with the operation mode of the terminal, and also, the operable mode of the terminal can also be checked by the communicating terminal.

The aforementioned terminal may further include: a certificate-of-privilege issuing terminal list table for storing a public key certificate of a terminal that has issued the certificate of privilege; an authentication-request receiver for receiving a second authentication request from the first terminal in response to the authentication request sent from the authentication request unit; a verification unit for verifying a second certificate of privilege contained in the second authentication request received by the authentication-request receiver by using a public key contained in the public key certificate stored in the certificate-of-privilege issuing terminal list table; and an operation-mode checker for determining, after the second certificate of privilege is successfully verified by the verification unit, that the second authentication request is rejected when the operation mode of the first terminal is not permitted by an operable mode contained in the second certificate of privilege. With this configuration, it is possible to check whether the operation mode of the communicating terminal contained in the beacon information is permitted by the certificate of privilege.

In the aforementioned terminal, the identifier may be a terminal identifier of the terminal that has issued the certificate of privilege, and the certificate-of-privilege issuing terminal list table may store the terminal identifier of the terminal that has issued the certificate of privilege, the public key certificate of the terminal that has issued the certificate of privilege, and a storage location of the certificate of privilege in the certificate of privilege table in association with each other. With this arrangement, the identifier that identifies the type of certificate of privilege can be associated with the certificate of privilege.

The aforementioned terminal may further include: a policy table for storing a management policy to be used with the first terminal; and a management-policy setting unit for setting a management policy contained in the second certificate of privilege in the policy table when the operation-mode checker determines that the second authentication request is not rejected. With this configuration, when conducting mutual authentication, the management policy contained in the certificate of privilege of a communicating terminal can be set as the management policy to be used with the communicating terminal.

According to a further aspect of the present invention, there is provided a terminal including: a status table for storing an operation mode of the terminal; and a sender for sending a signal including beacon information having the operation mode of the terminal to a first terminal. With this configuration, a beacon-signal reception terminal can check whether the operation mode of the reception terminal coincides with that of a beacon-signal transmission terminal.

According to a further aspect of the present invention, there is provided a terminal including: a certificate of privilege table for storing a certificate of privilege indicating an access right of the terminal; a status table for storing an operation mode of the terminal; a receiver for receiving from a first terminal a signal including beacon information having an identifier that identifies the type of certificate of privilege and an operation mode of the first terminal; and an authentication request unit for sending, when the operation mode of the terminal and the operation mode of the first terminal coincides with each other, an authentication request to the first terminal by providing the certificate of privilege that matches the identifier contained in the signal received by the receiver. With this configuration, by being triggered by a signal including beacon information sent from the first terminal, an authentication request can be sent to the first terminal whose operation mode coincides with that of the terminal by providing the type of certificate of privilege that matches the identifier contained in the signal.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

The aforementioned terminal may further include: a certificate-of-privilege issuing terminal list table for storing a public key certificate of a terminal that has issued the certificate of privilege; an authentication-request receiver for receiving a second authentication request from the first terminal in response to the authentication request sent from the authentication request unit; a verification unit for verifying a second certificate of privilege contained in the second authentication request received by the authentication-request receiver by using a public key contained in the public key certificate stored in the certificate-of-privilege issuing terminal list table; and an operation-mode checker for determining, after the second certificate of privilege is successfully verified by the verification unit, that the second authentication request is rejected when the operation mode of the first terminal is not permitted by an operable mode contained in the second certificate of privilege. With this configuration, it is possible to check whether the operation mode of a communicating terminal contained in the beacon information is permitted by the certificate of privilege.

In the aforementioned terminal, the identifier may be a terminal identifier of the terminal that has issued the certificate of privilege, and the certificate-of-privilege issuing terminal list table may store the terminal identifier of the terminal that has issued the certificate of privilege, the public key certificate of the terminal that has issued the certificate of privilege, and a storage location of the certificate of privilege in the certificate of privilege table in association with each other. With this arrangement, the identifier that identifies the type of certificate of privilege can be associated with the certificate of privilege.

The aforementioned terminal may further include: a policy table for storing a management policy to be used with the first terminal; and a management-policy setting unit for setting a management policy contained in the second certificate of privilege in the policy table when the operation mode checker determines that the second authentication request is not rejected. With this configuration, when conducting mutual authentication, the management policy contained in the certificate of privilege of a communicating terminal can be set as the management policy to be used with the communicating terminal.

According to a further aspect of the present invention, there is provided a terminal including: a certificate of privilege table for storing a certificate of privilege indicating an access right of the terminal; a status table for storing an operation mode of the terminal; and a sender for sending a first terminal a signal including beacon information having an identifier that identifies the type of certificate of privilege of the certificate of privilege table and the operation mode of the terminal. With this configuration, the type of certificate of privilege to be provided when sending an authentication request is known to a beacon-signal reception terminal, and also, the reception terminal can check whose operation mode coincides with that of a beacon-signal transmission terminal.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

According to a further aspect of the present invention, there is provided a terminal including: a certificate of privilege table for storing a plurality of certificates of privilege indicating an access right of the terminal; a status table for storing an operation mode of the terminal; a selector for providing an instruction to select one of the plurality of certificates of privilege stored in the certificate of privilege table; and a sender for sending a signal including beacon information having an identifier that identifies the type of the certificate of privilege selected by the selector and the operation mode of the terminal to a first terminal. With this configuration, the certificate of privilege is selected from a plurality of certificates of privilege and is known as the type of certificate of privilege to be provided when sending an authentication request.

In the aforementioned terminal, the identifier may be a terminal identifier of a terminal that has issued the certificate of privilege. With this arrangement, the certificate of privilege to be provided can be identified by the terminal identifier of the terminal that has issued the certificate of privilege.

According to a further aspect of the present invention, there is provided a processing method for use in a terminal which includes a certificate of privilege table for storing a certificate of privilege indicating an access right of the terminal, and a status table for storing an operation mode of the terminal. The processing method includes: a step of receiving from a first terminal a signal including beacon information having an identifier that identifies the type of certificate of privilege and an operation mode of the first terminal; and a step of sending, when the operation mode of the terminal and the operation mode of the first terminal coincides with each other, an authentication request to the first terminal by providing the certificate of privilege stored in the certificate of privilege table that matches the identifier contained in the signal. With this configuration, by being triggered by a signal including beacon information sent from the first terminal, an authentication request can be sent from the first terminal whose operation mode coincides with that of the terminal by providing the type of certificate of privilege that matches the identifier contained in the signal.

According to a further aspect of the present invention, there is provided a processing method for use in a terminal which includes a certificate of privilege table for storing a plurality of certificates of privilege indicating an access right of the terminal, and a status table for storing an operation mode of the terminal. The processing method includes: a step of providing an instruction to select one of the plurality of certificates of privilege from the certificate of privilege table; and a step of sending a signal including beacon information having an identifier that identifies the type of the selected certificate of privilege and the operation mode of the terminal to a first terminal. With this configuration, the certificate of privilege is selected from a plurality of certificates of privilege and is known as the type of certificate of privilege to be provided when an authentication request is made.

BRIEF DESCRIPTION OF THE DRAWINGS

FIG. 2 illustrates an example of the configuration of an attribute-certificate issuing terminal list table 610 used in the embodiment of the present invention;

FIG. 4 illustrates an example of the configuration of an attribute certificate table 620 used in the embodiment of the present invention;

FIG. 8 illustrates an example of the configuration of a policy table 680 used in the embodiment of the present invention;

FIG. 13 is a flowchart illustrating the mutual authentication processing performed by a beacon transmission terminal used in the embodiment of the present invention.

DESCRIPTION OF THE PREFERRED EMBODIMENTS

The present invention is described in detail below with reference to the accompanying drawings through illustration of a preferred embodiment.

Figure 1:
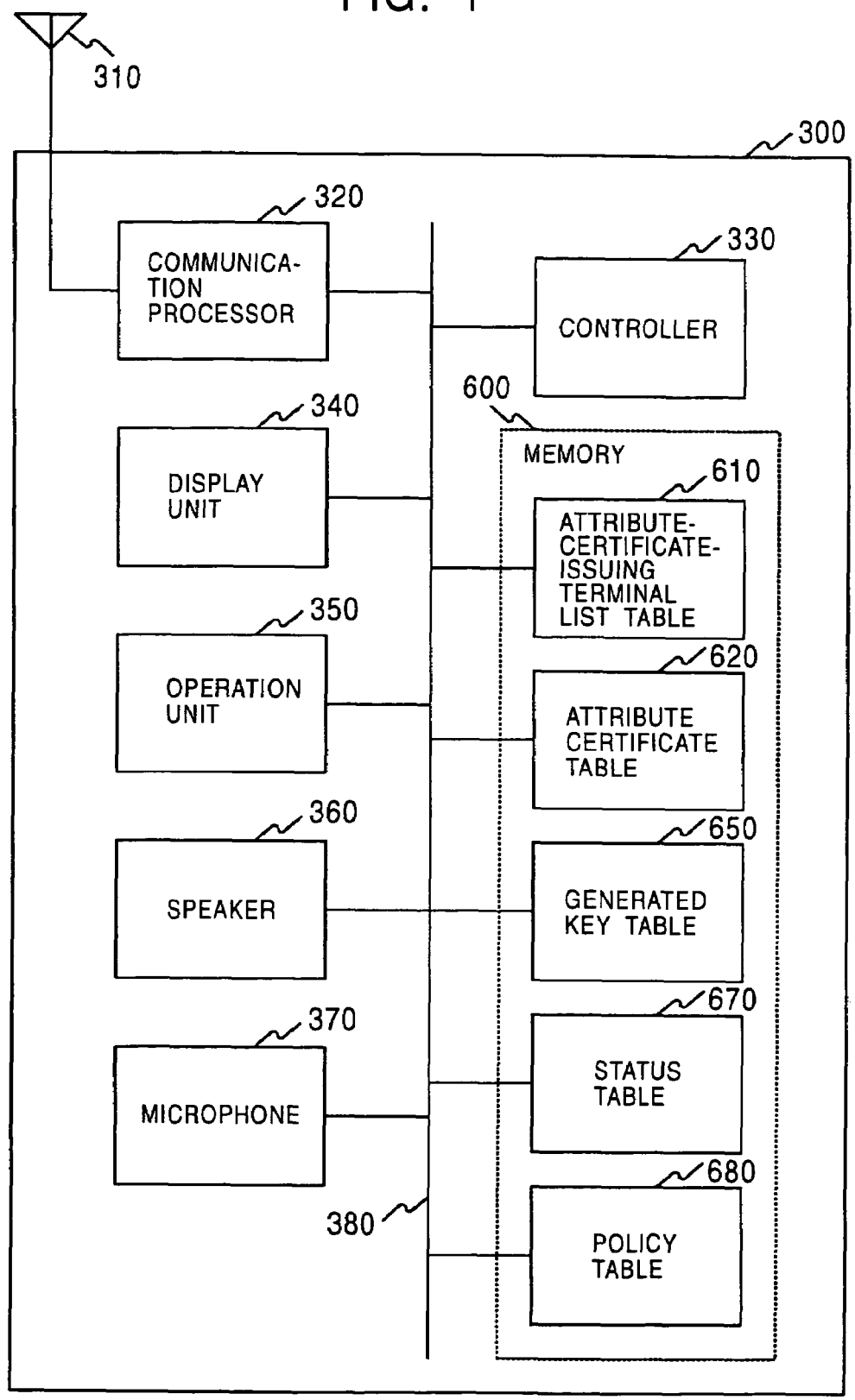
FIG. 1 is a block diagram illustrating the configuration of a wireless terminal 300 used in a wireless communication system according to an embodiment of the present invention.

FIG. 1 illustrates the configuration of a wireless terminal 300 used in a wireless communication system according to an embodiment of the present invention. The wireless terminal 300 includes a communication processor 320, a controller 330, a display unit 340, an operation unit 350, a speaker 360, a microphone 370, and a memory 600. These elements are connected to each other via a bus 380. An antenna 310 is connected to the communication processor 320. The communication processor 320 forms frames of the network interface layer (datalink layer) from a signal received via the antenna 310, and also transmits frames of the network interface layer via the antenna 310.

The controller 330 controls the overall wireless terminal 300; for example, it performs predetermined processing by referring to the frames formed by the communication processor 320. The display unit 340, for example, a liquid crystal display, displays predetermined information. The operation unit 350, for example, a keyboard or a button switch, is used for externally giving instructions to the wireless terminal 300. The speaker 360 outputs sound to attract user's attention or to exchange audio information with other terminals. The microphone 370 inputs sound from an external source to the wireless terminal 300 to exchange audio information with other terminals and to provide instructions.

The memory 600 stores an attribute-certificate-issuing terminal list table 610 in which information concerning terminals that have issued attribute certificates are stored, an attribute certificate table 620 in which an attribute certificate indicating an access right of the wireless terminal 300 is stored, a generated key table 650 in which a public key, a private key, and a public key certificate are stored as information indicating the generated keys of the wireless terminal 300, a status table 670 in which the operation state of the wireless terminal 300 is stored, and a policy table 680 in which a management policy used with each authenticated terminal is stored.

FIG. 2 illustrates an example of the configuration of the attribute-certificate-issuing terminal list table 610 used in this embodiment. The attribute-certificate-issuing terminal list table 610 stores information concerning terminals that issued attribute certificates in the past, and public key certificates 612 and attribute certificate indexes 613 are associated with terminal identifiers 611 of the attribute-certificate issuing terminals.

Any format may be used as the terminal identifiers 611 as long as it can uniquely identify the corresponding terminal in a network; for example, media access control (MAC) addresses in the Ethernet (registered) can be used. The public key certificates 612 are certificates of the terminals identified by the corresponding terminal identifiers 611. A public key certificate certifies the integrity of a certificate owner (subject), and includes a public key of the certificate owner. A signature is attached to the public key certificate by a certificate authority (CA), which is a certificate issuer. The attribute certificate indexes 613 indicate the storage locations of the attribute certificates in the attribute certificate table 620.

Figure 3:
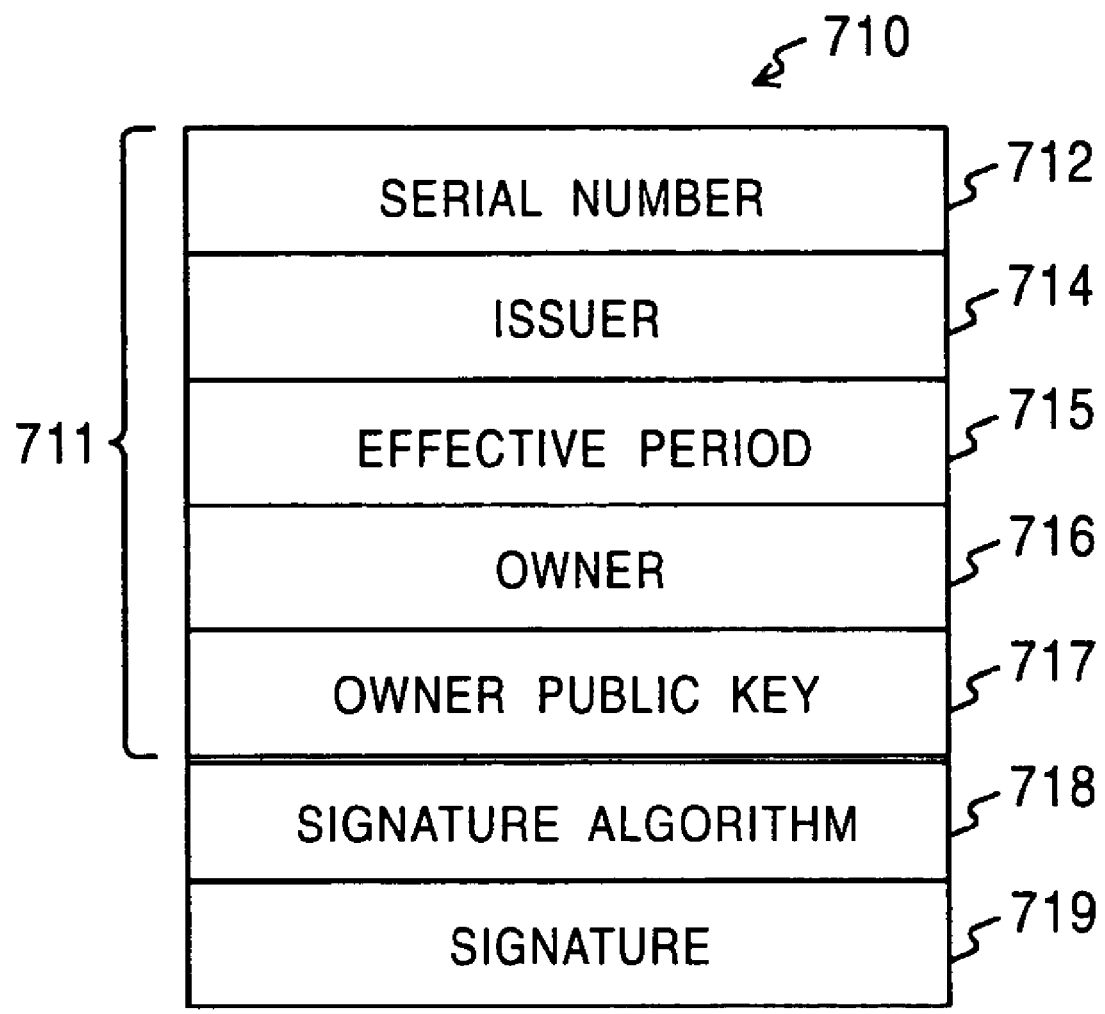
FIG. 3 illustrates a format 710 of a public key certificate 612 stored in the attribute-certificate issuing terminal list table 610 used in the embodiment of the present invention.

FIG. 3 illustrates a format 710 of the public key certificate 612 stored in the attribute-certificate-issuing terminal list table 610. The format 710 is mainly formed of a pre-signature certificate 711, a signature algorithm 718, and a signature 719. The pre-signature certificate 711 contains a serial number 712, an issuer 714, an effective period 715, an owner 716, and an owner public key 717.

The serial number 712 is the serial number of a public key certificate, and is numbered by the CA. The issuer 714 is the name of the CA, which is the issuer of the public key certificate. The public key certificate can be uniquely identified by the issuer 714 and the serial number 712. The effective period 715 is the effective period of the public key certificate. The owner 716 is the name of the owner of the public key certificate. The owner public key 717 is the public key of the owner 716.

The signature 719 is a signature attached to the public key certificate by the CA. The signature algorithm 718 is an algorithm used for generating this signature 719. The signature algorithm 719 consists of a message digest algorithm and a public key cryptosystem algorithm. The message digest algorithm is one of the hash functions (digest functions) and is an algorithm for generating a message digest of the pre-signature certificate 711. The message digest is a fixed-length bit string generated by compressing input data (pre-signature certificate 711), and is also referred to as a "seal" or a "fingerprint". As the message digest algorithm, for example, the secure hash algorithm-1 (SHA-1), the message digest #2 (MD2), and the message digest #5 (MD5), are known. The public key cryptosystem algorithm is an algorithm for encrypting a message digest generated by a message digest algorithm by using the private key of a CA. As the public key cryptosystem algorithm, for example, Rivest-Shamir-Adleman (RSA) based on the unique factorization problem and the digital signature algorithm (DSA) based on the discrete logarithm problem, are known. In this manner, the signature 719 is generated by encrypting the message digest of the pre-signature certificate 711 with the private key of the CA.

Accordingly, the message digest can be obtained by decrypting the signature 719 of the public key certificate with the public key of the CA. The user of the public key certificate generates a message digest of the pre-signature certificate 711 and compares it with the message digest decrypted by the public key of the CA. The user is then able to verify that the pre-signature certificate 711 is not tampered with.

FIG. 4 illustrates an example of the configuration of the attribute certificate table 620 used in this embodiment. An attribute certificate 622 stored in the attribute certificate table 620 is an attribute certificate indicating an access right of the wireless terminal 300. If the wireless terminal 300 has certificates issued from a plurality of attribute-certificate issuing terminals, a plurality of attribute certificates are stored. In this attribute certificate table 620, an index 621 is added to each attribute certificate 622. This index 621 is indicated by the attribute certificate index 613 of the attribute-certificate-issuing terminal list table 610. In this embodiment, the terminal identifier 611 of the attribute-certificate-issuing terminal list table 610 is used as the network identifier of a network in the wireless communication system, and after checking that the same network identifier is used, authentication is conducted between the terminals by using the attribute certificate 622 indicated by the index 613.

Figure 5:
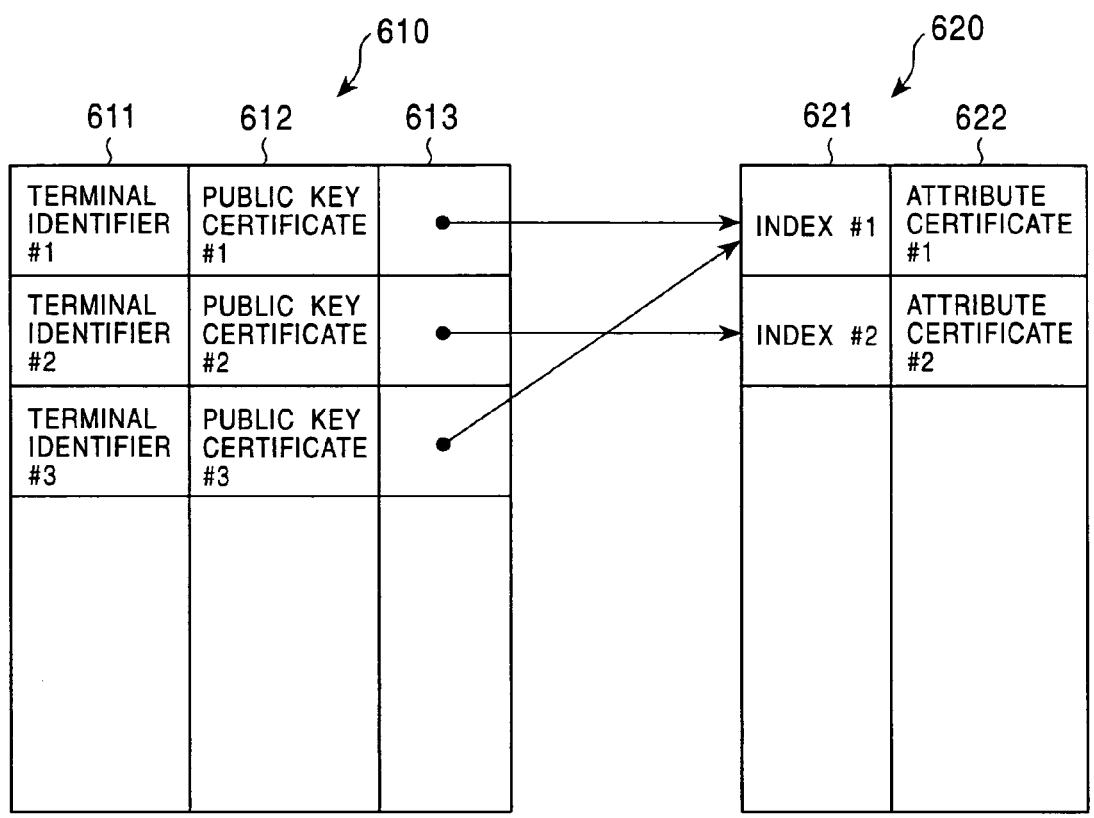
FIG. 5 illustrates the relationship between the attribute-certificate issuing terminal list table 610 and the attribute certificate table 620 used in the embodiment of the present invention.

FIG. 5 illustrates the relationship between the attribute-certificate-issuing terminal list table 610 and the attribute certificate table 620. In the attribute-certificate-issuing terminal list table 610, for each attribute-certificate issuing terminal, the terminal identifier 611, the public key certificate 612, and the attribute certificate index 613 are associated with each other. The attribute certificate index 613 also indicates the storage location (i.e., the index 621) of the attribute certificate 622 in the attribute certificate table 620.

In the wireless communication system of this embodiment, the presence of a plurality of attribute-certificate issuing terminals in a single network is allowed. In this case, for connecting to a network, it is sufficient that an attribute certificate is issued from one of the attribute-certificate issuing terminals. It is now assumed in FIG. 5, for example, that the terminals at the first and third rows of the attribute-certificate-issuing terminal list table 610 use the same network, and that the attribute certificate issued by the terminal at the first row is stored in the first row of the attribute certificate table 620. In this case, both the terminals at the first and third rows of the attribute certificate index 613 indicate the attribute certificate #1 at the first row of the attribute certificate table 620. Accordingly, mutual authentication can be conducted between a terminal having the attribute certificate issued by the terminal at the first row and a terminal having the attribute certificate issued by the terminal at the third row of the attribute-certificate-issuing terminal list table 610.

Accordingly, in the above-described example, in response to a communicating terminal indicating, as the network identifier, the terminal identifier #3 of the terminal at the third row of the attribute-certificate-issuing terminal list table 610, an authentication request can be made to such a communicating terminal by providing the attribute certificate #1 at the first row of the attribute certificate table 620 traced from the attribute certificate index 613 of the attribute-certificate-issuing terminal list table 610. When making an authentication request, the terminal identifier #1 of the terminal at the first row of the attribute-certificate-issuing terminal list table 610 is indicated as the network identifier, thereby enabling the communicating terminal to verify the attribute certificate #1.

Every time a new attribute-certificate issuing terminal is generated in a connecting network, it is added to the attribute-certificate-issuing terminal list table 610. In the wireless terminal 300, as described below, the "storage location of the current attribute certificate in the attribute certificate table 620" is stored in the status table 670, and for a new attribute-certificate issuing terminal, the "storage location of the current attribute certificate in the attribute certificate table 620" is set in the attribute certificate index 613. As described above, when a plurality of attribute-certificate issuing terminals are present in a single network, the existing attribute certificate can be indicated by the attribute certificate index 613 for the second and subsequent attribute-certificate issuing terminals. Thus, the terminal identifiers of the plurality of attribute-certificate issuing terminals can be designated with the same network identifier.

Figure 6:
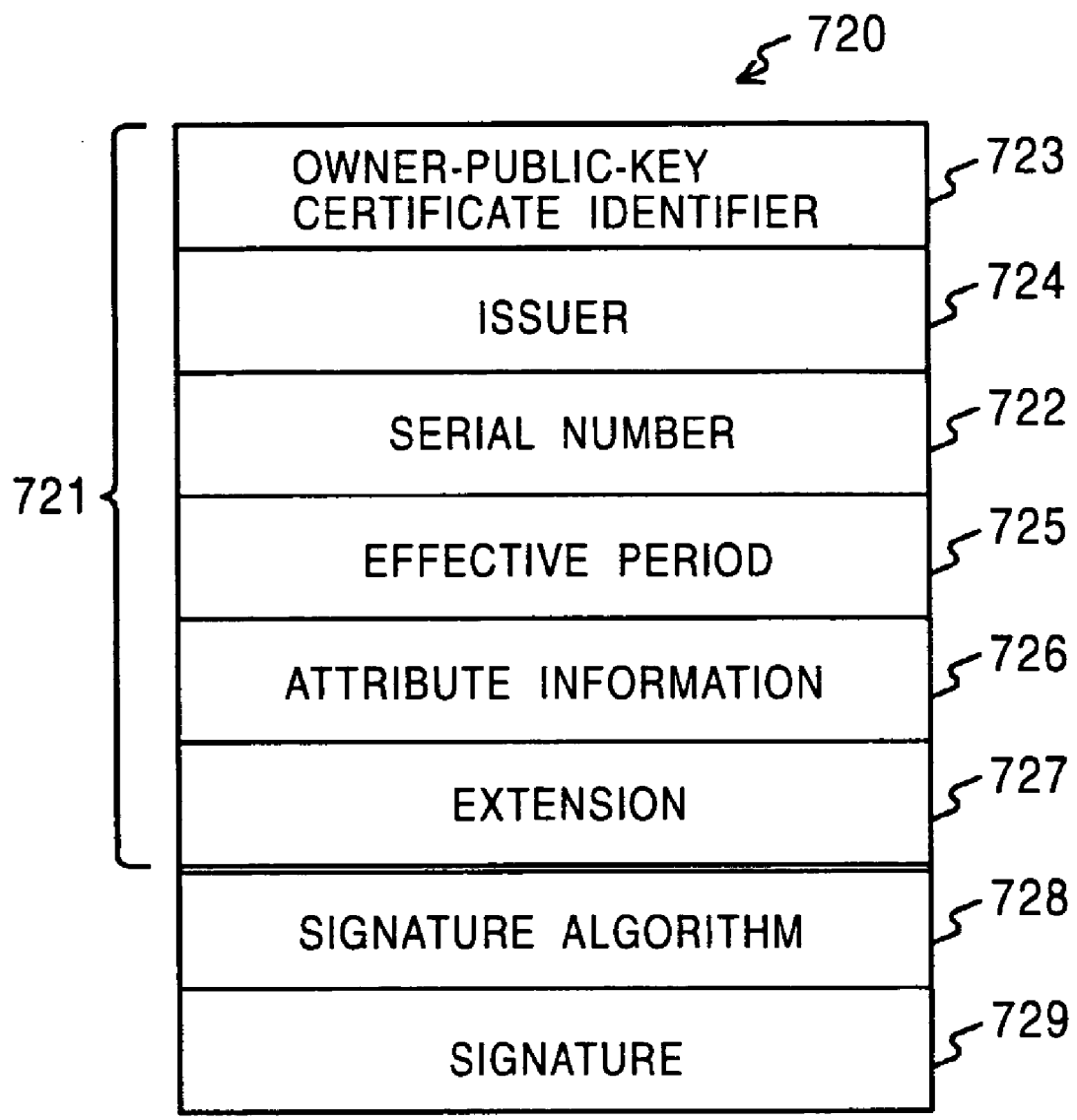
FIG. 6 illustrates a format 720 of an attribute certificate stored in the attribute certificate table 620 used in the embodiment of the present invention.

FIG. 6 illustrates a format 720 of an attribute certificate stored in the attribute certificate table 620. This attribute certificate is mainly formed of attribute certificate information 721, a signature algorithm 728, and a signature 729. The attribute certificate information 721 contains an owner public key certificate identifier 723, an issuer 724, a serial number 722, an effective period 725, attribute information 726, and an extension 727.

The owner public key certificate identifier 723 identifies the public key certificate of the owner of the attribute certificate, and more specifically, the public key certificate is identified by using the issuer 714 and the serial number 712 of the public key certificate 710 (FIG. 3). The issuer 724 is the name of an attribute certificate authority (AA), which is the issuer of the attribute certificate. The serial number 722 is a serial number of the attribute certificate and is numbered by the AA. The attribute certificate can be uniquely identified by the serial number 722 and the issuer 724. The effective period 725 is an effective period of the attribute certificate.

The attribute information 726 indicates the right or the capacity of the owner of the attribute certificate. For example, the operation mode that can be used in the terminal or the management policy that can be used with this terminal are defined.

The operation mode includes, for example, two modes: a public mode in which access is unlimitedly allowed for terminals connected to a network; and a private mode in which access only between terminals connected to a network is allowed. Each terminal can operate in the public mode or the private mode. If the operation mode defined in the attribute certificate designates "operable in private mode", the terminal can select the public mode or the private mode as the operation mode. If the operation mode defined in the attribute certificate designates "not operable in the private mode (public mode only)", the terminal is operable only in the public mode, and cannot be switched to the private mode.

The management policy includes, for example, a frame transfer policy in communication with a communicating terminal and a quality of service (QoS) policy.

As the frame transfer policy, the number of hops that relay frames between terminals can be restricted; for example, only one hop is allowed in the private mode. As the frame transfer policy, if there are a plurality of media to be linked, only specific media are used; for example, among the 2.4 GHz band, 2.5 GHz band, 5 GHz band, the millimetric wave band, and the ultra wideband (UWB), priority is given to the UWB or the 5 GHz band, which are operable at high speed.

As the QoS policy, the priority or the band can be changed for each application. For example, in a video stream, it is possible to select whether priority is given to the image quality or the smooth motion.

The extension 727 is used for preventing the unauthorized use or indicating additional information. Although in this embodiment the operation mode or the management policy is indicated in the attribute information 726, it may be indicated in the extension 727.

The signature 729 is a signature attached to the attribute certificate by the AA. The signature algorithm 728 is an algorithm used for generating the signature 729. The signature algorithm 728 is similar to the signature algorithm 718 of the public key certificate, and the signature 729 is generated by encrypting the message digest of the attribute certificate information 721 with the private key of the AA.

Accordingly, the message digest can be obtained by decrypting the signature 729 of the attribute certificate with the public key of the AA. The user of the attribute certificate generates a message digest of the attribute certificate information 721 and compares it with the message digest decrypted with the public key of the AA. The user is then able to verify that the attribute certificate information 721 is not tampered with.

In this embodiment, the attribute certificate is described as an example of a certificate of privilege (which is a certificate that serves to authorize a terminal to access a network, as described above). However, such a privilege may be described in, for example, eXtensible Markup Language (XML), and a signature is attached to the privilege by a corresponding authority. Such a certificate also functions as a certificate of privilege.

Figure 7:
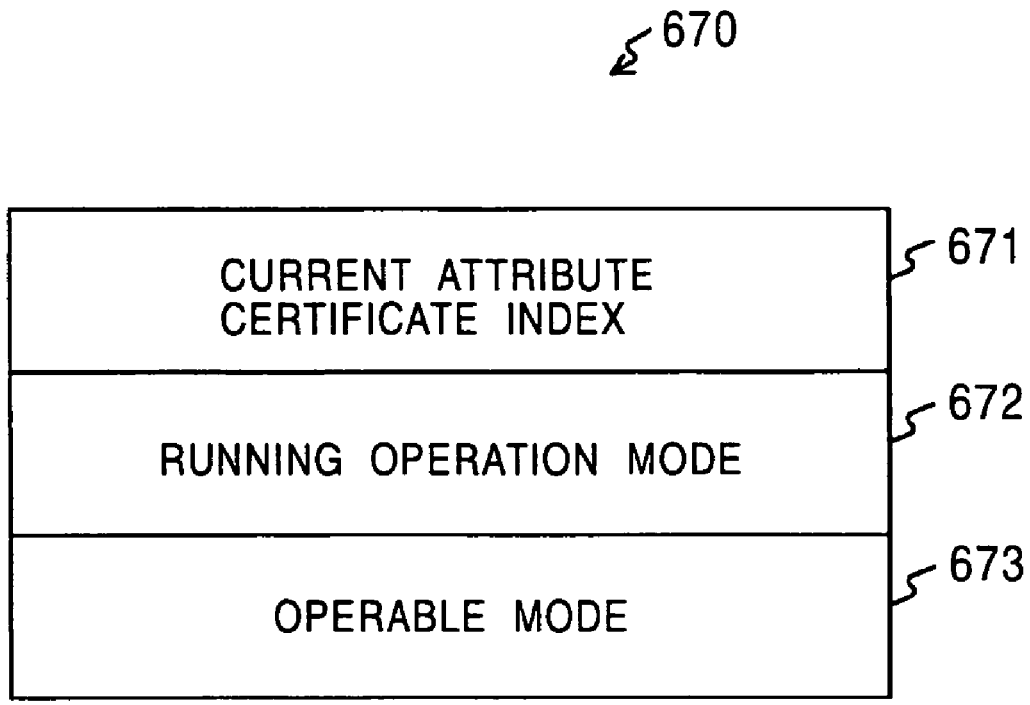
FIG. 7 illustrates an example of the configuration of a status table 670 used in the embodiment of the present invention.

FIG. 7 illustrates an example of the configuration of the status table 670 in this embodiment. The status table 670 stores the operation state of the wireless terminal 300, and includes a current attribute certificate index 671, a running operation mode 672, and an operable mode 673.

The current attribute certificate index 671 indicates the storage location of the currently used attribute certificate in the attribute certificate table 620. Specifically, the storage location means the index 621 of the attribute certificate table 620. The currently used attribute certificate is an attribute certificate used for connecting to a network, and the terminal identifier of the terminal that has issued the attribute certificate is designated as the network identifier in a beacon, which indicates the presence of the terminal, as described below. When registering the second and subsequent attribute-certificate issuing terminals in the attribute-certificate-issuing terminal list table 610, the content of the current attribute certificate index 671 is set in the attribute certificate index 613.

The running operation mode 672 represents the operation mode running in the wireless terminal 300. The operable mode 673 indicates the operation mode permitted by the currently used attribute certificate. If the operable mode 673 is "operable in the private mode", either of the public mode or the private mode can be set as the running operation mode 672. If the operable mode 673 is "not operable in the private mode", only the public mode can be set as the running operation mode 672.

FIG. 8 illustrates an example of the configuration of the policy table 680 in this embodiment. The policy table 680 is used for determining various management policies with authenticated terminals, and stores a management policy 682 for each terminal identifier 681. Settings are made in the policy table 680 when conducting mutual authentication according to the attribute certificate of a communicating terminal contained in an authentication request message. If, in a terminal X, a management policy, for example, in which the terminal X does not relay frames to another terminal, is defined in the attribute certificate of the terminal X, a terminal to conduct mutual authentication with the terminal X sets the management policy of the terminal X in the management policy 682 corresponding to the terminal identifier 681 of the terminal X.

Figure 9:
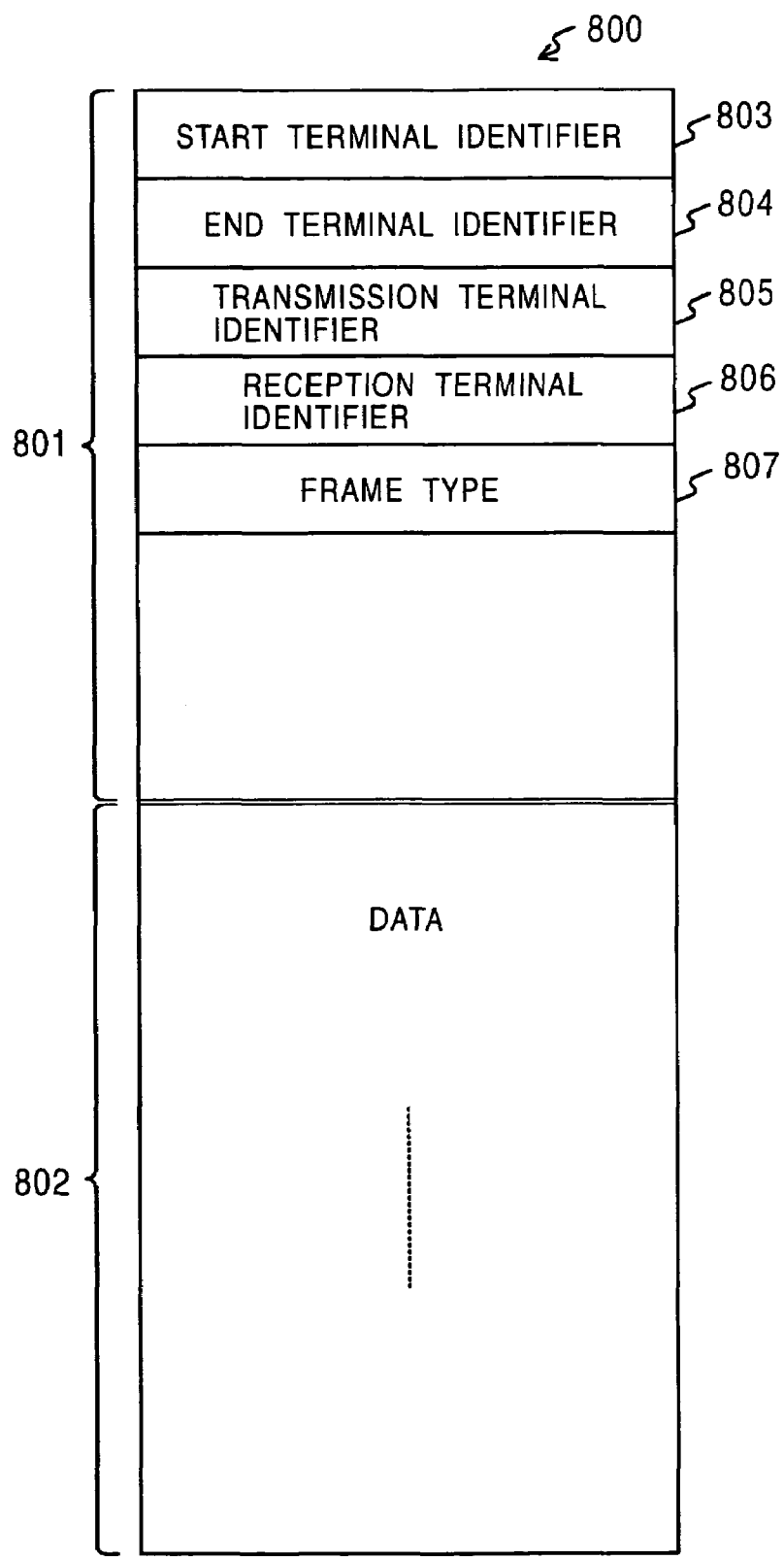
FIG. 9 illustrates the configuration of a frame 800 used in communication in the embodiment of the present invention.

FIG. 9 illustrates the configuration of a frame 800 used in communication in this embodiment. The frame 800 is mainly formed of a header 801 and a payload 802. The header 801 contains a start terminal identifier 803, an end terminal identifier 804, a transmission terminal identifier 805, a reception terminal identifier 806, and a frame type 807. In the payload 802, data according to the frame type 807 is stored.

The start terminal identifier 803 is the terminal identifier of the terminal, which is the source of this frame. As the terminal identifier, as stated above, an identifier that can uniquely identify the corresponding terminal in the network should be used, for example, a MAC address in the Ethernet (registered), can be used. The end terminal identifier 804 is the terminal identifier of the terminal, which is the final destination of this frame.

The transmission terminal identifier 805 and the reception terminal identifier 806 are used when relaying the frame. In a wireless ad-hoc communication system, not all the terminals in a network can directly communicate with each other, and when a frame is transmitted to a terminal that radio waves do not reach, a communication channel must be established by multi-hopping via other terminals. In this case, the transmission terminal identifier 805 and the reception terminal identifier 806 are used between the terminals transmitting and receiving the frame. The frame type 807 indicates the type of this frame 800.

The operation of the wireless communication system of this embodiment is described below with reference to the accompanying drawings.

Figure 10:
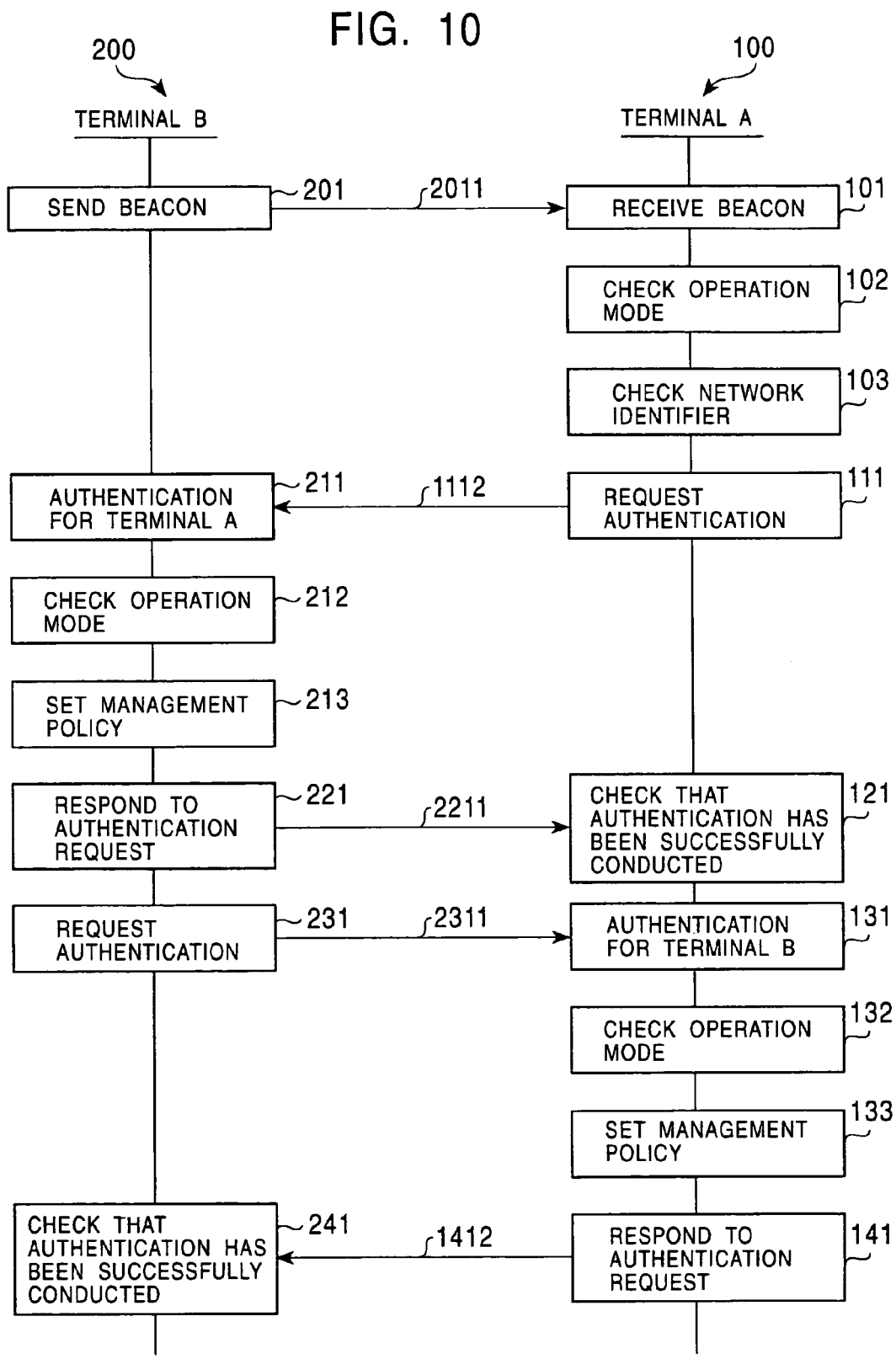
FIG. 10 illustrates an example of a mutual authentication process between terminals used in the embodiment of the present invention.

FIG. 10 illustrates an example of a mutual authentication process between terminals in this embodiment. In FIG. 10, a terminal A (100) is a wireless terminal, which has already entered the network, and a terminal B (200) is a wireless terminal, which is to enter the network.

This mutual authentication process is started by receiving a beacon from the terminal B by the terminal A. In a wireless communication system having a base station, the base station transmits a beacon, and the sub stations receive the beacon. In a wireless ad-hoc communication system without a base station, each terminal transmits a beacon to the other terminals so that the presence of each terminal can be made known to the other terminals. In this embodiment, the beacon includes, not only a beacon signal containing beacon information, but also data information added to the beacon information.

Figure 11:
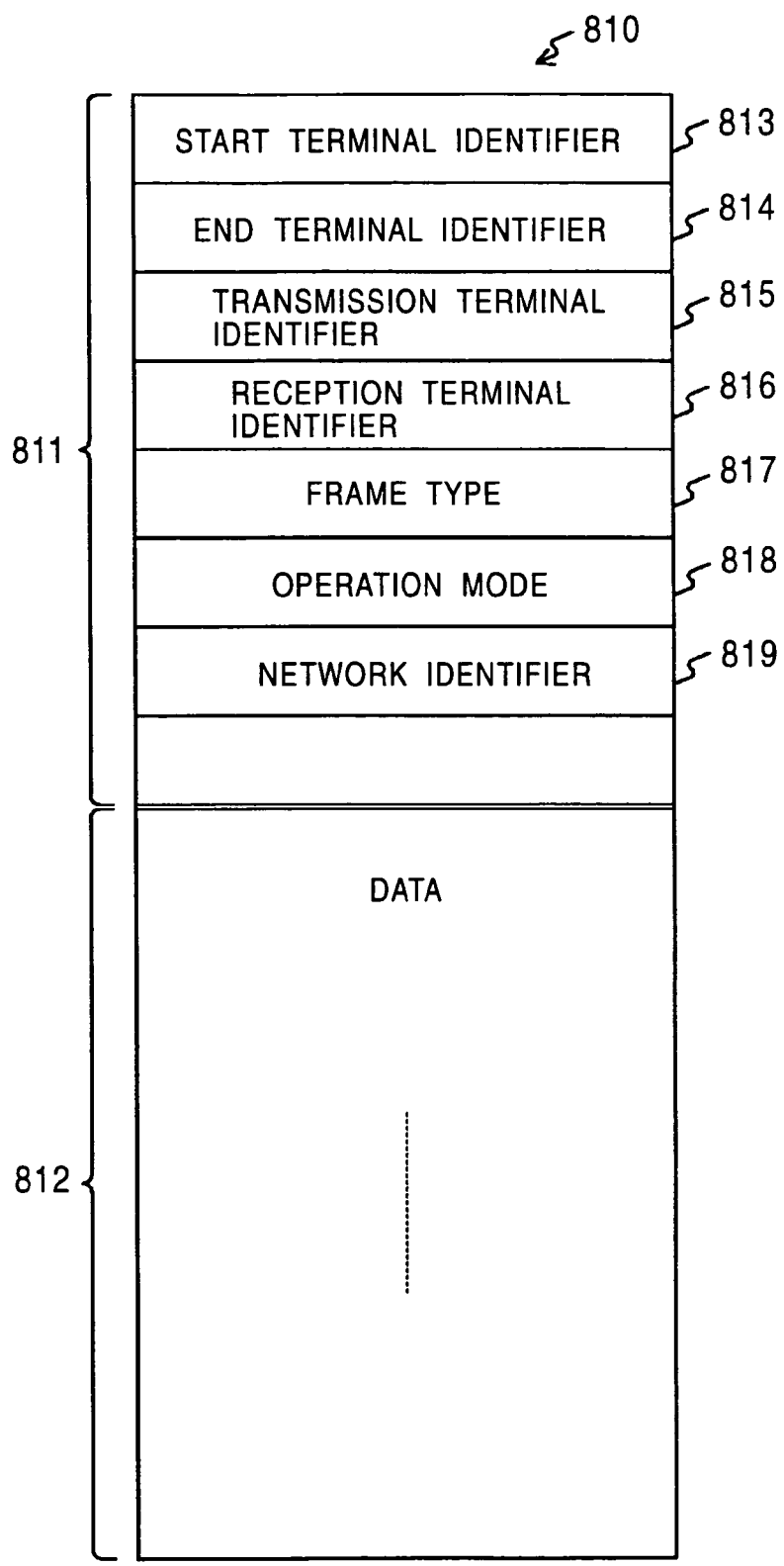
FIG. 11 illustrates the configuration of a beacon frame 810 used in the embodiment of the present invention.

The configuration of the beacon is described below with reference to a beacon frame 810 shown in FIG. 11. The beacon frame 810 is based on the configuration of the frame 800 shown in FIG. 9. The beacon frame 810 is mainly formed of a header 811 and a payload 812. In the header 810, the configurations of a start terminal identifier 813, an end terminal identifier 814, a transmission terminal identifier 815, and a reception terminal identifier 816 are similar to those of the counterparts shown in FIG. 9. A frame type 817 indicates that this frame is a beacon frame. In an operation mode 818, the running operation mode 672 in the status table 670 is indicated as the operation mode of the terminal B, which is a beacon transmission terminal.

In a network identifier 819, as the type of attribute certificate used for connecting to a network, for example, the terminal identifier of a terminal that has issued the attribute certificate is indicated. If a valid terminal identifier is not stored in this identifier field (for example, if only 0s are indicated in the identifier field), it means that the beacon transmission terminal (terminal B) does not own an attribute certificate.

If a plurality of attribute certificates are stored in the attribute certificate table 620, the wireless terminal 300 instructs the user to select the attribute certificate to be used for transmitting a beacon by using the display unit 340, the operation unit 350, the speaker 360, or the microphone 370.

Referring back to FIG. 10, in step 201, the terminal B sends a beacon 2011 having the above-described frame configuration. Then, in step 101, the terminal A receives the beacon 2011. Then, in step 102, the terminal A checks whether the operation mode 818 indicated in the beacon 2011 coincides with the running operation mode 672 of the terminal A. Accordingly, only the terminals operating in the same operation mode are allowed to access each other.

In step 103, the terminal A then searches the same terminal identifier as the network identifier 819 indicated in the beacon 2011 from the terminal identifiers 611 of the attribute-certificate-issuing terminal list table 610, and indexes the attribute certificate table 620 indicated by the attribute certificate index 613 corresponding to the searched terminal identifier 611 so as to select the attribute certificate 622.

In step 111, the terminal A sends an authentication request message 1112 to the terminal B by providing the selected attribute certificate. The frame configuration of the authentication request message 1112 is compliant with that of the frame 800 shown in FIG. 9. The frame type 807 indicates that this frame is an authentication request frame. The payload 812 includes the public key certificate and the attribute certificate of the terminal A. The public key certificate verifies the integrity of the terminal A, and the attribute certificate verifies the right of the terminal A.

Upon receiving the authentication request message 1112 from the terminal A, in step 211, the terminal B conducts authentication for the terminal A by using the attribute certificate contained in the authentication request message 1112. More specifically, the terminal B extracts the public key of the attribute certificate authority (AA) from the public key certificate 612 (FIG. 2) of the attribute-certificate-issuing terminal list table 610, and decrypts the signature 729 (FIG. 6) of the attribute certificate contained in the authentication request message 1112 by using the public key, thereby obtaining the message digest when the signature was attached. The terminal B then generates a message digest of the attribute certificate information 721 (FIG. 6) of the attribute certificate, and checks whether the generated message digest coincides with the message digest when the signature was attached. If the message digests are different, the attribute certificate has been tampered with after the signature was attached, and the integrity of the terminal A is not verified. If both the message digests are the same, the terminal B also determines whether the owner public key certificate identifier 723 (FIG. 6) of the attribute certificate contained in the authentication request message 1112 coincides with the issuer 714 and the serial number 712 (FIG. 3) of the public key certificate contained in the authentication request message 1112. If the identifier 723 coincides with the issuer 714 and the serial number 712, it can be proved that the terminal A, which is the owner of the public key certificate, is the owner of the attribute certificate. If not, the owner of the attribute certificate is not the terminal A, and the integrity of the terminal A cannot be verified.

After authenticating the terminal A in step 211, the terminal B checks whether the operable mode defined in the attribute information 726 of the attribute certificate contained in the authentication request message 1112 coincides with the running operation mode 672 of the status table 670 of the terminal B. Accordingly, for example, if a terminal operable in the private mode sends a beacon and receives an authentication request message from a dishonest terminal whose operable mode is "not operable in the private mode", the terminal can reject the authentication request since the operable mode defined in the attribute information 726 of the attribute certificate contained in the authentication request message indicates "not operable in the private mode".

After checking the operation mode in step 212, in step 213, the terminal B sets the management policy defined in the attribute information 726 of the attribute certificate contained in the authentication request message 1112 in the management policy 682 of the policy table 680 in the terminal B. Then, in step 221, the terminal B sends an authentication success message 2211 indicating that the terminal A has been successfully authenticated to the terminal A. The frame configuration of the authentication success message 2211 is compliant with that of the frame 800 shown in FIG. 9. The frame type 807 indicates that this frame is an authentication success frame. The header 801 also contains information concerning the type of reason for the success. The configuration of an authentication failure frame is similar to that of the authentication success frame 2211.

Then, in step 231, the terminal B sends an authentication request message 2311 to the terminal A. The frame configuration of the authentication request message 2311 is similar to that of the authentication request message 1112. The payload 812 contains the public key certificate and the attribute certificate of the terminal B.

Upon receiving the authentication request message 2311 from the terminal B, in step 131, the terminal A conducts authentication for the terminal B by using the attribute certificate contained in the authentication request message 2311. Authentication is conducted as described above by checking the attribute certificate and the owner of the attribute certificate.

After authenticating the terminal B in step 131, the terminal A checks in step 132 whether the operable mode defined in the attribute information 726 of the attribute certificate contained in the authentication request message 2311 from the terminal B coincides with the running operation mode 672 of the status table 670 of the terminal A. Accordingly, for example, if a dishonest terminal whose operable mode is "not operable in the private mode" sends a beacon in the "private mode", and also sends an authentication request message, the beacon reception terminal can reject the authentication request since the operable mode defined in the attribute information 726 of the attribute certificate contained in the authentication request message is "not operable in the private mode".

After checking the operation mode in step 132, in step 133, the terminal A sets the management policy defined in the attribute information 726 of the attribute certificate contained in the authentication request message 2311 in the management policy 682 of the policy table 680 of the terminal A. Then, in step 141, the terminal A sends an authentication success message 1412 indicating that the terminal B has been successfully authenticated to the terminal B. The frame configuration of the authentication success message 1412 is similar to that of the authentication success message 2211. In step 241, the terminal B receives and acknowledges the authentication success message 1412.

After verifying the integrity of the terminal A and the terminal B, mutual authentication is completed.

A description is now given of the processing performed by each terminal in the wireless communication system according to the present invention with reference to the accompanying drawings.

Figure 12:
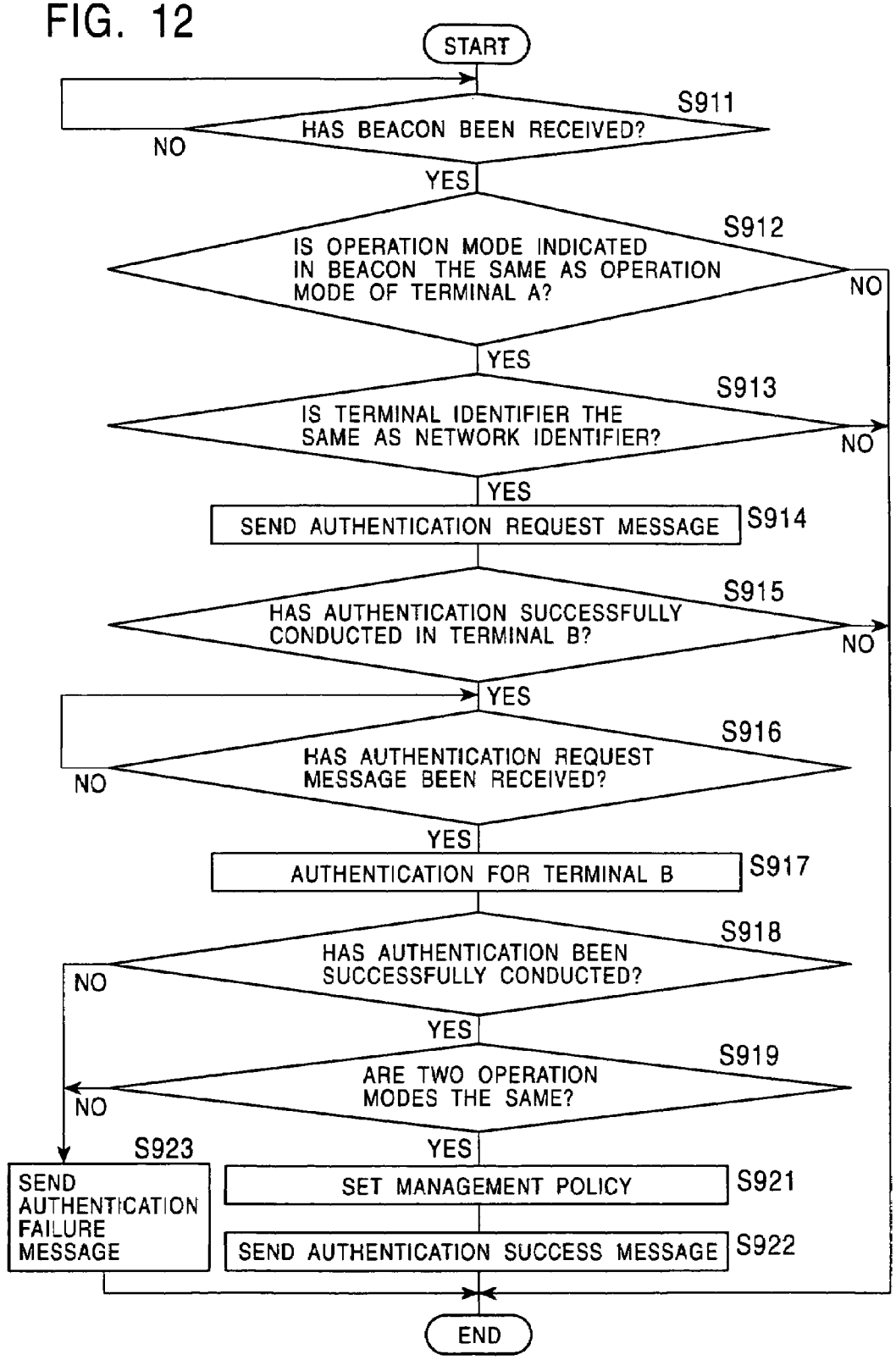
FIG. 12 is a flowchart illustrating mutual authentication processing performed by a beacon reception terminal used in the embodiment of the present invention.

FIG. 12 is a flowchart illustrating the mutual authentication processing performed by the terminal A shown in FIG. 10. In step S911, the terminal A determines whether a beacon signal has been received from the terminal B. If the outcome of step S911 is yes, the terminal A further determines in step S912 whether the operation mode 818 indicated in the beacon coincides with the running operation mode 672 of the terminal A. If the two modes are different, the terminal A terminates the processing without making an authentication request.

If the operation modes 818 and 672 are found to be the same in step S912, the terminal A searches for the terminal identifier 611 of the attribute-certificate-issuing terminal list table 610 and determines in step S913 whether the searched terminal identifier is the same as the network identifier 819 indicated in the beacon. If the two identifiers are different, the terminal A terminates the processing without making an authentication request.

If the terminal identifier 611 is found to be the same as the network identifier 819 in step S913, in step S914, the terminal A sends an authentication request message to the terminal B by providing the attribute certificate 622 of the attribute certificate table 620 indicated by the attribute certificate index 613 corresponding to the terminal identifier 611. The terminal A then determines in step S915 whether authentication for the terminal A has succeeded in the terminal B. If authentication has failed in the terminal B, the terminal A terminates the processing.

If authentication has succeeded in step S915, the terminal A further determines in step S916 whether the terminal A has received an authentication request message from the terminal B. If the outcome of step S916 is yes, the terminal A conducts authentication for the terminal B in step S917. The terminal A then determines in step S918 whether authentication for the terminal B has succeeded. If the integrity of the terminal B cannot be verified for the reason, for example, that the attribute certificate cannot be verified, the terminal A sends an authentication failure message to the terminal B in step S923.

If the integrity of the terminal B is verified in step S918, the terminal A determines in step S919 whether the operable mode defined in the attribute information 726 of the attribute certificate contained in the authentication request message from the terminal B coincides with the running operation mode 672 of the status table 670 of the terminal A. If the two modes are different, the terminal A sends an authentication failure message to the terminal B in step S923.

If the two modes are found to be the same in step S919, in step S921, the terminal A sets the management policy defined in the attribute information 726 of the attribute certificate contained in the authentication request message in the management policy 682 of the policy table 680 of the terminal A. Then, in step S922, the terminal A sends an authentication success message to the terminal B.

FIG. 13 is a flowchart illustrating the mutual authentication processing performed by the terminal B shown in FIG. 10. In step S931, the terminal B sends a beacon to the terminal A by providing the operation mode 818 and the network identifier 819 based on the attribute certificate used for connecting to a network. The terminal B then determines in step S932 whether an authentication request message has been received from the terminal A in response to the beacon. If the result of step S932 is yes, the terminal B conducts authentication for the terminal A in step S933. The terminal B then determines in step S934 whether the terminal A has been successfully authenticated. If the integrity of the terminal A cannot be verified for the reason, for example, that the attribute certificate cannot be verified, the terminal B sends an authentication failure message to the terminal A in step S941.

If the integrity of the terminal A can be verified in step S934, the terminal B determines in step S935 whether the operable mode defined in the attribute information 726 of the attribute certificate contained in the authentication request message from the terminal A coincides with the running operation mode 672 of the status table 670 of the terminal B. If the two modes are different, the terminal B sends an authentication failure message to the terminal A in step S941.

If the two modes are found to be the same in step S935, in step S936, the terminal B sets the management policy defined in the attribute information 726 of the attribute certificate contained in the authentication request message in the management policy 682 of the policy table 680 of the terminal B. Then, in step S937, the terminal B sends an authentication success message to the terminal A. Subsequently, in step S938, the terminal B sends an authentication request message to the terminal A. Then, in step S939, the terminal B receives an authentication response message from the terminal A in response to the authentication request message.

As described above, according to the above-described embodiment, by providing in a beacon the terminal identifier of an attribute-certificate issuing terminal as the network identifier 819, the attribute certificate can be associated with a network. Also by providing the operation mode 818 in the beacon, a determination can be immediately made as to whether the terminal operates in the private mode or the public mode when connecting to a network.

Although in this embodiment each terminal autonomously forms the wireless communication system of the present invention, one of the terminals may operate as a base station.

While the present invention has been described with reference to what is presently considered to be the preferred embodiment, it is to be understood that the invention is not limited to the disclosed embodiment. Various modifications can be made without departing from the spirit of the present invention.

A series of processes disclosed in this specification may be considered as a method having such a series of processes, or as a program for allowing a computer (terminal) to execute such a series of processes, or as a recording medium storing such a program.

What is claimed is:

1. A wireless communication system including a plurality of terminals, comprising:
an ad-hoc network;
a first terminal configured to send, using the ad-hoc network, a signal that includes beacon information having a first identifier that identifies the origin of the sent beacon and a second identifier that identifies an issuing terminal of a certificate of privilege; and
a second terminal configured to send, using the ad-hoc network, an authentication request to the first terminal in response to the signal sent from the first terminal by providing the certificate of privilege which matches the second identifier,
wherein the certificate of privilege includes encrypted data for certifying the second terminal, the second terminal comprising:
a certificate-of-privilege issuing terminal list table for storing a public key certificate of a terminal that has issued the certificate of privilege;
authentication-request receiving means for receiving a second authentication request from the first different terminal in response to the authentication request sent from the authentication request means;
verification means for verifying a second certificate of privilege contained in the second authentication request received by the authentication-request receiving means by using a public key contained in the public key certificate stored in the certificate-of-privilege issuing terminal list table; and
operation-mode checking means for determining, after the second certificate of privilege is successfully verified by the verification means, that the second authentication request is rejected when the operation mode of the different terminal is not permitted by an operable mode contained in the second certificate of privilege.

2. A terminal according to claim 1, wherein:
the identifier is a terminal identifier of the terminal that has issued the certificate of privilege; and
the certificate-of-privilege issuing terminal list table stores the terminal identifier of the terminal that has issued the certificate of privilege, the public key certificate of the terminal that has issued the certificate of privilege, and a storage location of the certificate of privilege in the certificate of privilege table in association with each other.

3. A terminal according to claim 1, further comprising:
a policy table for storing a management policy to be used with the different terminal; and
management-policy setting means for setting a management policy contained in the second certificate of privilege in the policy table when the operation-mode checking means determines that the second authentication request is not rejected.

4. A terminal comprising:
a certificate of privilege table for storing a plurality of certificates of privilege indicating an access right of the terminal;
a status table for storing an operation mode of the terminal;
selection means for providing an instruction to select one of the plurality of certificates of privilege stored in the certificate of privilege table; and
sending means for sending a different terminal a signal including beacon information having a first identifier that identifies the origin of the sent beacon and a second identifier that identifies an issuing terminal of a certificate of privilege selected by the selection means and the operation mode of the terminal,
wherein the certificate of privilege includes encrypted data for certifying the second terminal, the second terminal comprising:
a certificate-of-privilege issuing terminal list table for storing a public key certificate of a terminal that has issued the certificate of privilege;
authentication-request receiving means for receiving a second authentication request from the first different terminal in response to the authentication request sent from the authentication request means; verification means for verifying a second certificate of privilege contained in the second authentication request received by the authentication-request receiving means by using a public key contained in the public key certificate stored in the certificate-of-privilege issuing terminal list table; and
operation-mode checking means for determining, after the second certificate of privilege is successfully verified by the verification means, that the second authentication request is rejected when the operation mode of the different terminal is not permitted by an operable mode contained in the second certificate of privilege.

5. A terminal according to claim 4, wherein the identifier is a terminal identifier of a terminal that has issued the certificate of privilege.

* * * * *